(12) United States Patent
Liao et al.

(10) Patent No.: US 9,754,402 B2
(45) Date of Patent: Sep. 5, 2017

(54) GRAPHICS PROCESSING METHOD AND GRAPHICS PROCESSING APPARATUS

(71) Applicant: MEDIATEK INC., Hsin-Chu (TW)

(72) Inventors: Ming-Hao Liao, Hsinchu (TW);
Sung-Fang Tsai, Hsinchu (TW);
Pei-Kuei Tsung, New Taipei (TW);
Hung-Wei Wu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 141 days.

(21) Appl. No.: 14/675,759

(22) Filed: Apr. 1, 2015

(65) Prior Publication Data
US 2015/0332495 A1    Nov. 19, 2015

Related U.S. Application Data

(60) Provisional application No. 61/992,239, filed on May 13, 2014.

(51) Int. Cl.
*G06T 15/00* (2011.01)
*G06T 11/40* (2006.01)

(52) U.S. Cl.
CPC ............ *G06T 15/005* (2013.01); *G06T 11/40* (2013.01)

(58) Field of Classification Search
CPC .......... G09G 2360/12; G09G 2360/122; G06T 7/407; G06T 15/005; G06T 11/40
See application file for complete search history.

(56) References Cited

U.S. PATENT DOCUMENTS

| | | | |
|---|---|---|---|
| 8,692,848 B2 * | 4/2014 | Adams | G06T 11/40 345/426 |
| 8,830,246 B2 * | 9/2014 | Seetharamaiah | G06T 15/005 345/522 |
| 8,952,962 B2 * | 2/2015 | Son | G06T 15/005 345/426 |

(Continued)

FOREIGN PATENT DOCUMENTS

| | | |
|---|---|---|
| EP | 2 317 479 A1 | 5/2011 |
| EP | 2 279 495 B1 | 10/2015 |

OTHER PUBLICATIONS

Iosif Antochi et al., Memory Bandwidth Requirements of Tile-Based Rendering, pp. 323-332, XP009126264, Jan. 2004.
Office Action issued May 25, 2017 in U.S. Appl. No. 14/689,062.

*Primary Examiner* — Antonio A Caschera
(74) *Attorney, Agent, or Firm* — Oblon, McClelland, Maier & Neustadt, L.L.P.

(57) ABSTRACT

A graphics processing method and an associated graphics processing apparatus, where the graphics processing method is applied to the graphics processing apparatus, the graphics processing apparatus may be positioned within an electronic device, and the graphics processing apparatus may comprise at least one portion of the electronic device. The graphics processing method includes the steps of: calculating vertex positions of a primitive in a binning phase; determining, according to specific information, whether to compute vertex varyings of the primitive in the binning phase or in a rendering phase so as to provide a determination result; computing the vertex varyings in the binning phase or in the rendering phase according to the determination result; and rendering the primitive according to the vertex positions and the vertex varyings in the rendering phase.

20 Claims, 7 Drawing Sheets

(56) References Cited

U.S. PATENT DOCUMENTS

2010/0177105 A1 7/2010 Nystad
2011/0148901 A1 6/2011 Adams et al.
2013/0135322 A1 5/2013 Seetharamaiah
2014/0139534 A1 5/2014 Tapply et al.

* cited by examiner

GRAPHICS PROCESSING METHOD AND GRAPHICS PROCESSING APPARATUS

CROSS REFERENCE TO RELATED APPLICATIONS

This application claims the benefit of U.S. Provisional Application No. 61/992,239, which was filed on May 13, 2014, and is included herein by reference.

BACKGROUND

The present invention relates to the internal circuitry of a graphics processing unit (GPU), and more particularly, to a graphics processing method and an associated graphics processing apparatus.

A conventional portable electronic device such as a conventional mobile phone may have a processor (e.g. a central processing unit (CPU)) to control operations of the conventional portable electronic device, and may further have a conventional GPU to perform graphics related calculations. According to the related art, the conventional GPU can be implemented to be suitable for the conventional immediate rendering technologies or the conventional tile-based rendering (TBR) technologies. However, some problems may occur. For example, as it seems unlikely that the entire frame can be stored inside the chip of the conventional GPU, the conventional immediate rendering technologies typically require a lot of memory access operations that are unnecessary. More particularly, in some situations, the conventional immediate rendering technologies may cause an irregular access order, which may decrease the memory access efficiency. In another example, in comparison with the conventional immediate rendering technologies, the conventional TBR technologies typically require extra hardware costs. More particularly, the conventional TBR technologies may need extra memory allocation.

In conclusion, both of the conventional immediate rendering technologies and the conventional TBR technologies have their own limitations, and they are weak in graphics processing and may need a lot of bandwidth for some scenarios. Thus, a novel architecture is required for saving memory usage and bandwidth.

SUMMARY

It is an objective of the claimed invention to provide a graphics processing method, and an associated graphics processing apparatus, in order to solve the above-mentioned problems.

It is another objective of the claimed invention to provide a graphics processing method, and an associated graphics processing apparatus, in order to save memory usage and bandwidth.

It is yet another objective of the claimed invention to provide a graphics processing method, and an associated graphics processing apparatus, in order to enhance the overall performance of an electronic device without introducing any side effect.

According to at least one preferred embodiment, a graphics processing method is provided, where the graphics processing method is applied to a graphics processing apparatus within an electronic device. The graphics processing method may comprise the steps of: calculating vertex positions of a primitive in a binning phase; determining, according to specific information, whether to compute vertex varyings of the primitive in the binning phase or in a rendering phase so as to provide a determination result; computing the vertex varyings in the binning phase or in the rendering phase according to the determination result; and rendering the primitive according to the vertex positions and the vertex varyings in the rendering phase.

According to at least one preferred embodiment, a graphics processing apparatus is provided, where the graphics processing apparatus may be positioned within an electronic device, and the graphics processing apparatus may comprise at least one portion of the electronic device. For example, the apparatus comprises a checking circuit and at least one shader that is coupled to the checking circuit. The checking circuit is arranged for determining, according to specific information, whether to compute vertex varyings of a primitive in a binning phase or in a rendering phase so as to provide a determination result. In addition, the aforementioned at least one shader is arranged for calculating vertex positions of the primitive in the binning phase, computing the vertex varyings in the binning phase or in the rendering phase according to the determination result, and rendering the primitive according to the vertex positions and the vertex varyings in the rendering phase.

It is an advantage of the present invention that the present invention method and the associated apparatus can enhance the overall performance of the electronic device without introducing any side effect. In addition, in comparison with the related art, the present invention method and the associated apparatus can prevent the related art problems (e.g. the problem of a lot of memory access operations that are unnecessary, and the problem of extra memory allocation). More particularly, the present invention method and the associated apparatus are capable of saving memory usage and bandwidth. For example, by adaptively analyzing the scenario being encountered, the present invention method and the associated apparatus can choose the best solution for the current vertex, the current primitive, and/or the current scene.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
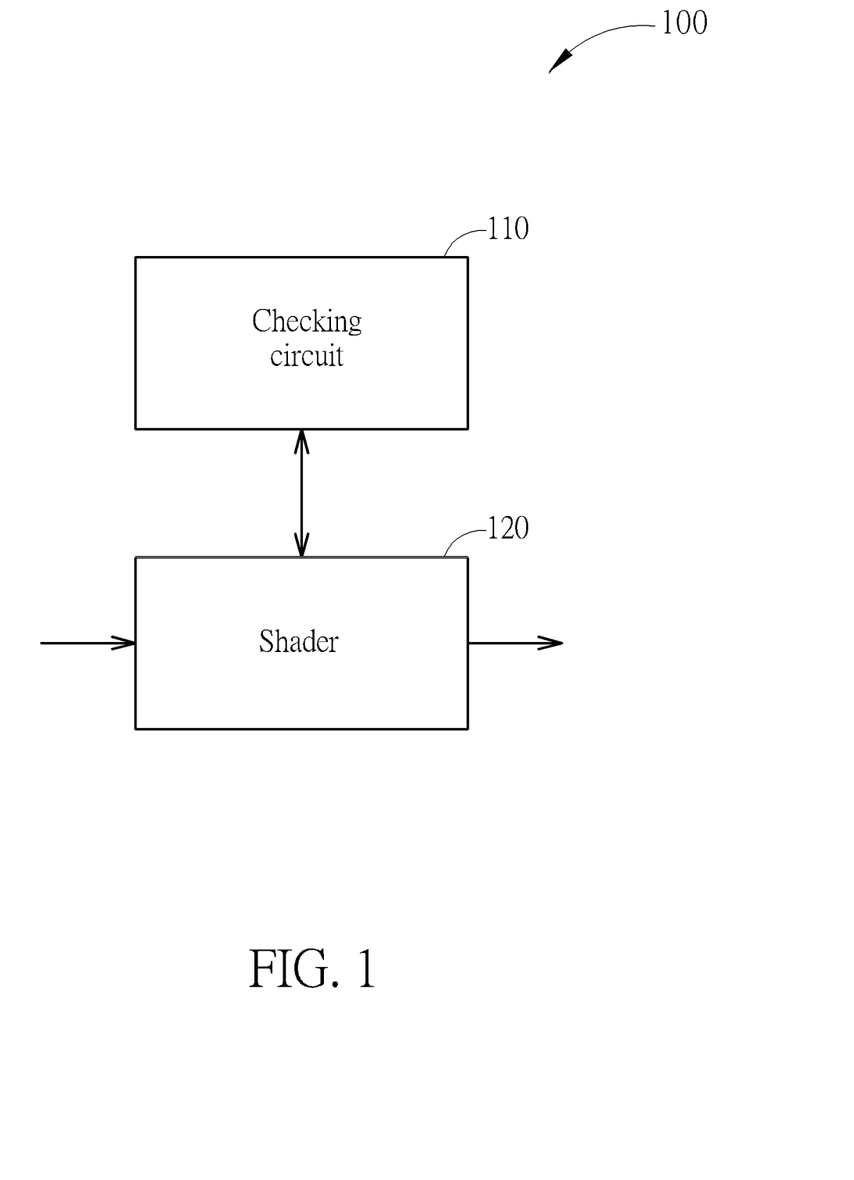
FIG. 1 is a diagram of a graphics processing apparatus according to a first embodiment of the present invention.

FIG. 1 is a diagram of a graphics processing apparatus 100 according to a first embodiment of the present invention, where the graphics processing apparatus 100 may be positioned within an electronic device, and the graphics processing apparatus may comprise at least one portion (e.g. a portion or all) of the electronic device. For example, the apparatus 100 may comprise a portion of the electronic device mentioned above, and more particularly, can be at least one hardware circuit such as at least one integrated circuit (IC) within the electronic device and associated circuits thereof. In another example, the apparatus 100 can be the whole of the electronic device mentioned above. In another example, the apparatus 100 may comprise a system comprising the electronic device mentioned above, such as an audio/video playback system comprising the electronic device. Examples of the electronic device may include, but not limited to, a mobile phone (e.g. a multifunctional mobile phone), a personal digital assistant (PDA), a tablet, and a personal computer such as a laptop computer or a desktop computer.

As shown in FIG. 1, the graphics processing apparatus 100 may comprise a checking circuit 110, and may further comprise at least one shader that is coupled to the checking circuit 110, such as one or more shaders, which can be collectively referred to as the shader 120 in this embodiment. For example, the aforementioned at least one shader may be implemented with a plurality of vertex shaders (VSs) arranged for playing different roles in graphics processing (or performing different shading operations). In another example, the aforementioned at least one shader may be implemented with at least one unified VS (e.g. one or more VSs) arranged for playing different roles (or performing different shading operations) when needed. In practice, the checking circuit 110 and the aforementioned at least one shader (e.g. the shader 120) may be positioned within a graphics processing circuit such as a graphics processing unit (GPU), no matter whether the aforementioned at least one shader is implemented with the plurality of VSs or the aforementioned at least one unified VS.

According to this embodiment, the checking circuit 110 may be arranged for performing at least one determination operation (e.g. one or more determination operations) to generate at least one determination result (e.g. one or more determination results). In addition, the aforementioned at least one shader (e.g. one or more shaders), such as the shader 120, may be arranged for performing position processing, computing some vertex varyings according to the aforementioned at least one determination result, and rendering at least one primitive (e.g. one or more primitives) according to the vertex positions and the vertex varyings of the aforementioned at least one primitive.

Please note that some embodiments of the present invention may focus on interactions between VS operations, such as interactions between operations of different physical VSs or interactions between operations of different VS roles (or roles of VS) played by the same physical VS (e.g. a unified shader). Thus, some shaders described hereinafter, such as the shaders VS0, VS1, and VS2, should be interpreted based on a functional view point, and the shaders VS0, VS1, and VS2 may be directed to calculations regarding vertices. For example, the shader VS0 may be interpreted as a VS role played by a physical VS to calculate positions of a vertex according to attributes, and the shaders VS1 and VS2 may be interpreted as two VS roles played by this physical VS to calculate the varying of the vertex according to attributes, respectively. In other words, there may be only one physical VS (or only one set of physical hardware), and the one physical VS may simultaneously or time-divisionally perform operations of the VS roles VS0, VS1, and VS2, in parallel, for example.

During the progress of GPU techniques, a conventional method in the related art suggests using different physical VSs, each of which is equipped with a fixed function of VS, to perform different VS operations, and another conventional method in the related art suggests using one shader (such as a hardware circuit capable of performing different operations according to different command sets) to perform different VS operations, and therefore this one shader may be referred to as the unified VS. However, the term "unified shader" (or UX) may be frequently used in the related art, instead of the unified VS, where the unified shader may be a calculation core that is capable of simultaneously performing GPU calculations such as vertex shading, fragment shading, pixel shading, etc. Therefore, the term "shader" in some embodiments of the present invention may be directed to one or more unified shaders, based on different viewpoints, respectively.

In addition, different terms regarding operations before or during tiling may be used in the related art. Please note that the term "binning phase" in the following embodiments of the present invention may correspond to associated processing performed before tiling, and may be directed to processing data of the whole frame (e.g. the vertices of all primitives of the whole frame). In comparison with this, the term "rendering phase" in these embodiments of the present invention may correspond to associated processing performed in unit of tile. For example, a frame may comprise N tiles, and the graphics processing apparatus 100 may complete associated calculations of the binning phase (e.g. calculating the positions and varyings of all vertices on the whole frame) in one iteration, while the graphics processing apparatus 100 may need N iterations to complete associated calculations of the rendering phase (e.g. rendering all pixels within one tile corresponding to one iteration). Therefore, one physical VS (or one set of physical hardware) such as one unified shader in these embodiments may perform the calculations corresponding to the binning phase in a time interval and perform the calculations corresponding to the rendering phase in another time interval, or may even perform the calculations corresponding to the binning phase and the rendering phase simultaneously if the computation resource is sufficient. This is for illustrative purposes only, and is not meant to be a limitation of the present invention.

Figure 2:
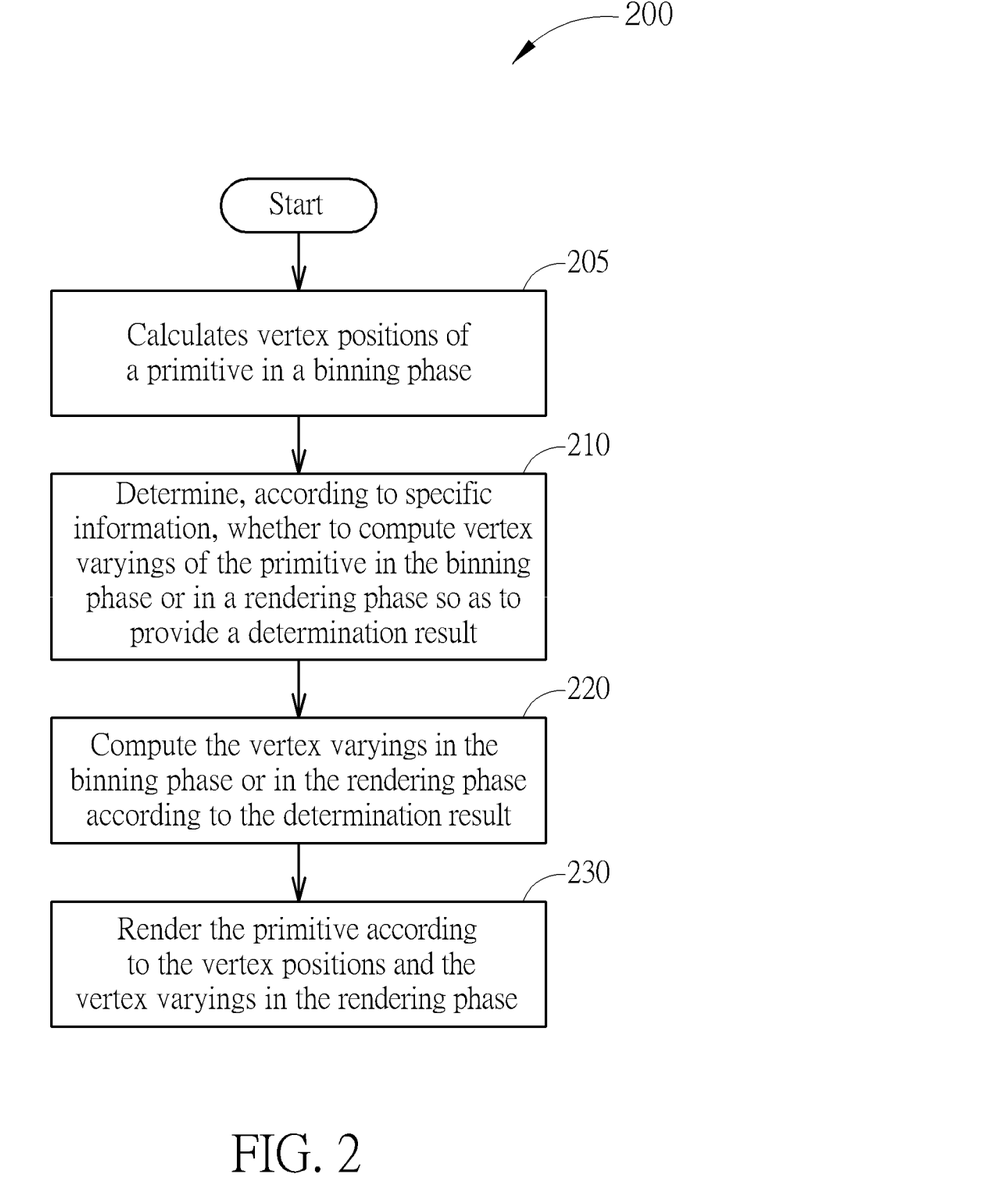
FIG. 2 illustrates a flowchart of a graphics processing method according to an embodiment of the present invention.

FIG. 2 illustrates a flowchart of a graphics processing method 200 according to an embodiment of the present invention. The graphics processing method 200 shown in FIG. 2 can be applied to the graphics processing apparatus 100 shown in FIG. 1, and can be applied to the checking circuit 110 thereof. The graphics processing method can be described as follows.

In Step 205, the shader 120 calculates vertex positions of a primitive in a binning phase. For instance, if the primitive is a triangle, there are three vertices in this primitive. As such, there might be three vertex positions of the primitive.

In Step 210, the checking circuit 110 determines, according to specific information, whether to compute vertex varyings of the primitive in the binning phase or in a rendering phase so as to provide a determination result. As the checking circuit 110 may perform the aforementioned at least one determination operation to generate the aforementioned at least one determination result, the determination result mentioned in Step 210 can be taken as an example of the aforementioned at least one determination result. Please note that some primitives (e.g. triangles) may be suitable for being processed in the binning phase, while some other primitives (e.g. triangles) may be suitable for being processed in the rendering phase. For example, when a triangle touches multiple tiles, calculating vertex varyings of this triangle should be performed in the binning phase to reduce the computation overhead (or the computation loading) since performing the same varying calculations will not be repeated if these varying calculations are performed in the binning phase. Should these varying calculations be performed in the rendering phase, these varying calculations would be repeated for every tile, and therefore performing these varying calculations in the rendering phase is not the best choice. In another example, when a triangle only touches one tile, it might be better to calculate vertex varyings of this triangle in the rendering phase since the memory access bandwidth may be lower with the computation overhead being roughly equal to the case of calculating vertex varying of this triangle in the binning phase.

In Step 220, the shader 120 computes the vertex varyings in the binning phase or in the rendering phase according to the determination result. For example, in a situation where the primitive mentioned in Step 205 is the triangle touching the aforementioned multiple tiles, calculating the vertex varyings of this triangle should be performed in the binning phase to reduce the computation overhead (or the computation loading), and the determination result may indicate that the shader 120 should compute the vertex varyings in the binning phase. In another example, in a situation where the primitive mentioned in Step 205 is the triangle positioned within the aforementioned only one tile, calculating the vertex varyings of this triangle should be performed in the rendering phase, and the determination result may indicate that the shader 120 should compute the vertex varyings in the rendering phase. Therefore, it is possible (and workable) in some embodiments that the shader 120 comprise only one physical VS (or only one set of physical hardware) and this one physical VS may process some vertices in the binning phase and may process some other vertices in the rendering phase. This is for illustrative purposes only, and is not meant to be a limitation of the present invention. According to some embodiments, in a situation where the shader 120 is implemented with a plurality of VSs, one of the plurality of VSs that is suitable for processing in the binning phase may be selected for computing the vertex varyings of one primitive in the binning phase, and another of the plurality of VSs that is suitable for processing in the binning phase may be selected for computing the vertex varyings of another primitive in the binning phase. In another example, in a situation where the shader 120 is implemented with a unified VS, some of the computation resource of the shader 120 may be allocated for computing some vertex varyings in the binning phase, and at substantially the same time some other computation resource may be allocated for computing some other vertex varyings in a rendering phase.

In Step 230, the shader 120 renders the primitive according to the vertex positions and the vertex varyings in the rendering phase. Common tasks performed in Step 230 include fragment shading, pixel shading and blending, etc. For example, at least one varying (e.g. one or more varyings) of the vertex varyings may be a varying of a vertex of the primitive. This is for illustrative purposes only, and is not meant to be a limitation of the present invention. According to some embodiments, at least one varying (e.g. one or more varyings) of the vertex varyings may be a varying of a point within the primitive. In this situation, the shader 120 may prepare the varying of the point within the primitive for further calculations regarding another primitive such as a smaller primitive divided from this primitive. For example, the shader 120 may divide the primitive mentioned in Step 205 into some smaller primitives, and the aforementioned point within the primitive may be a vertex of at least one (e.g. one or more) of these smaller primitives. Regarding implementation details of dividing the primitive mentioned in Step 205 into these smaller primitives, please refer to some technical documents of the tessellation techniques in the related art.

In this embodiment, the determination result may be one of the following:
(1). tag information; and
(2). a control signal;
where the tag information may be accessible by a pointer associated with the primitive, and the control signal may be applied to a circuitry of the graphics processing apparatus. This is for illustrative purposes only, and is not meant to be a limitation of the present invention.

According to this embodiment, the checking circuit 110 may check whether the specific information complies with a selection criterion so as to provide the determination result correspondingly. For example, in a situation where the determination result is the tag information, the tag information may indicate whether the vertex varyings of the primitive should be computed in the binning phase or in the rendering phase. In other words, the checking circuit 110 may notify the shader 120 of whether the vertex varyings is determined to be computed in the binning phase or in the rendering phase through the tag information. Thus, by utilizing the tag information, the checking circuit 110 may control whether the vertex varyings are computed in the binning phase or in the rendering phase.

Please note that the tag information may indicate a plurality of values in different situations, respectively. For example, the tag information may indicate one of the plurality of values (e.g. a first value), and therefore, in response to the tag information indicating this value (e.g. the first value), the aforementioned at least one shader (e.g. the shader 120) computes the vertex varyings in the binning phase. In another example, the tag information may indicate another of the plurality of values (e.g. a second value), and therefore, in response to the tag information indicating this value (e.g. the second value), the checking circuit 110 may control the aforementioned at least one shader (e.g. the shader 120) to compute the vertex varyings in the rendering phase.

According to some embodiments, the specific information may comprise the attribute and the varying of each vertex of the primitive and the size W of the primitive, such as the number of bins (or tiles) that the primitive touches, and the selection criterion may be related to the bandwidth, the size W of the primitive, the attribute, and/or the varying. More particularly, in a situation where the varying is not changed, if W>1, the vertex varyings of the primitive tend to be computed in the binning phase as the attribute increases. In addition, in a situation where the attribute is not changed, the vertex varyings of the primitive tend to be computed in the rendering phase as the varying increases. For example, the selection criterion may be determined according to a criterion determination operation; wherein, if the operation result of the criterion determination operation is less than zero, the vertex varyings is determined to be computed in the rendering phase; if the operation result of the criterion determination operation is greater than zero, the vertex varyings is determined to be computed in the binning phase. Thus, the selection criterion can be regarded as a predetermined selection criterion. This is for illustrative purposes only, and is not meant to be a limitation of the present invention. According to some embodiments, the selection criterion for one primitive PRIMITIVE1 is based on the comparison result of the size W1 of the primitive PRIMITIVE1 (e.g. the vertex varyings of the primitive PRIMITIVE1 is determined to be computed in the binning phase if W1>3, or the vertex varyings of the primitive PRIMITIVE1 is determined to be computed in the rendering phase if W1<=3), while the selection criterion for another primitive PRIMITIVE2 is based on the comparison result of the size W2 of the primitive PRIMITIVE2 (e.g. the vertex varyings of the primitive PRIMITIVE2 is determined to be computed in the binning phase if W2>4, or the vertex varyings of the primitive PRIMITIVE2 is determined to be computed in the rendering phase if W2<=4), these selection criterions can be regarded as a dynamically generated selection criterion. According to some embodiments, the selection criterion for one primitive PRIMITIVE1 is based on the comparison result of the size W1 of the primitive PRIMITIVE1 (e.g. the vertex varyings of the primitive PRIMITIVE1 is determined to be computed in the binning phase if W1>3, or the vertex varyings of the primitive PRIMITIVE1 is determined to be computed in the rendering phase if W1<=3), while the selection criterion for another primitive PRIMITIVE2 is based on the bandwidth, these selection criterions can be regarded as a dynamically generated selection criterion.

In practice, implementation details regarding the specific information may vary in various embodiments of the present invention. According to some embodiments, the specific information may be information of a primitive size of the primitive, and the selection criterion may correspond to a primitive size threshold. In addition, the checking circuit 110 may check whether the primitive size reaches the primitive size threshold so as to provide the determination result correspondingly. According to some embodiments, the specific information may be information of a bin count of a plurality of bins touched by the primitive, and the selection criterion may correspond to a bin count threshold. In addition, the checking circuit 110 may check whether the bin count reaches the bin count threshold so as to provide the determination result correspondingly. According to some embodiments, the specific information may be information of a shader code architecture, and the selection criterion may correspond to classification information for classifying the shader code architecture. In addition, the checking circuit 110 may classify the shader code architecture according to the information of the shader code architecture and according to the classification information so as to provide the determination result correspondingly. According to some embodiments, the specific information may be complier information.

According to some embodiments, whether to compute the vertex varyings of the primitive in the binning phase or in the rendering phase may be determined primitive by primitive. This is for illustrative purposes only, and is not meant to be a limitation of the present invention. According to some embodiments, the varying calculations may be performed frame by frame, and the varying calculations of all primitives within the whole frame such as a frame of a series of frames may be performed in only one of the binning phase and the rendering phase. For example, whether the varying calculations of all primitives within this frame of the series of frames should be performed in which of the binning phase and the rendering phase may be determined according to primitive statistics information of this frame, such as the number of primitives in the whole frame or the sizes of the primitives in this frame. In another example, whether the varying calculations of all primitives within this frame of the series of frames should be performed in which of the binning phase and the rendering phase may be determined according to the degree of similarity between the aforementioned primitive statistics information of this frame and the primitive statistics information of the previous frame.

According to some embodiments, the specific information may be updated frame by frame. In addition, the apparatus 100 may analyze a specific frame to update the specific information for the specific frame, where the specific frame may comprise the primitive.

According to some embodiments, the operation of Step 205 may be performed according to a set of attributes associated with the primitive. Thus, the aforementioned at least one shader (e.g. the shader 120) may calculate the vertex positions of the primitive in the binning phase according to the set of attributes associated with the primitive. For example, the aforementioned at least one shader may render the primitive according to a plurality of screen space positions and according to the vertex varyings in the rendering phase.

Figure 3:
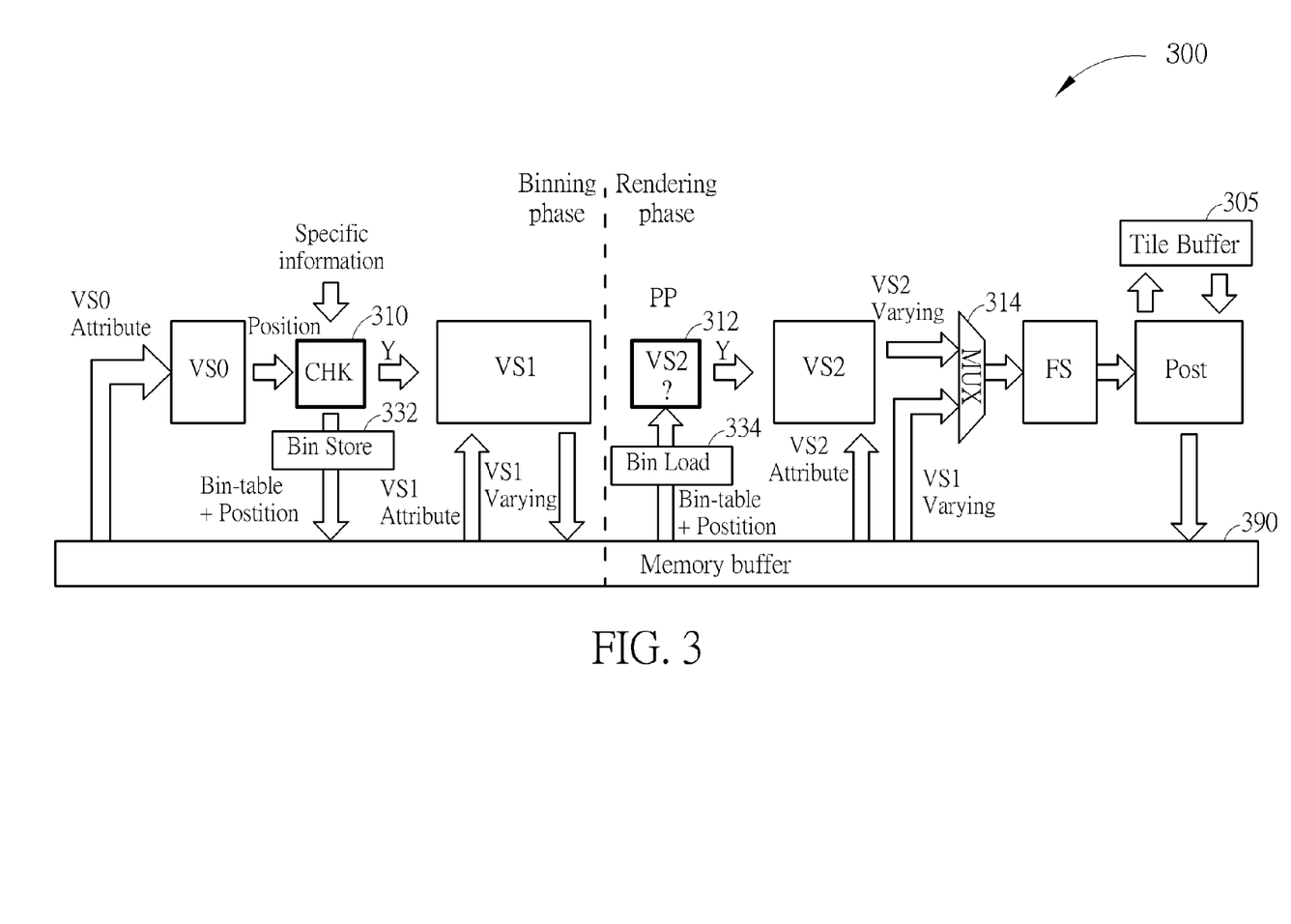
FIG. 3 illustrates an adaptive vertex shading control scheme involved with the graphics processing method shown in FIG. 2 according to an embodiment of the present invention.

FIG. 3 illustrates an adaptive vertex shading control scheme involved with the graphics processing method 200 shown in FIG. 2 according to an embodiment of the present invention. For example, the architecture 300 shown in FIG. 3 may be arranged for performing adaptive vertex shading scheduling in a graphics processing pipeline, such as a TBR pipeline, etc., where the graphics processing pipeline may be a GPU pipeline. For better comprehension, the left half of FIG. 3 is labeled "Binning phase", and the right half of FIG. 3 is labeled "Rendering phase". This is for illustrative purposes only, and is not meant to be a limitation of the present invention.

As shown in FIG. 3, the architecture 300 may comprise a set of shaders {VS0, VS1, VS2, FS, Post} and a tile buffer 305, and comprise a checking circuit 310, a selective pass circuit 312, a multiplexing circuit 314, a bin store circuit 332, and a bin load circuit 334 (respectively labeled "CHK", "VS2?", "MUX", "Bin Store", and "Bin Load" in FIG. 3, for brevity), and may further comprise a memory buffer 390, where the checking circuit 310 can be taken as an example of the checking circuit 110, and the set of shaders {VS0, VS1, VS2, FS, Post} can be taken as an example of the aforementioned at least one shader such as the shader 120. For example, the set of shaders {VS0, VS1, VS2, FS, Post}, the checking circuit 310, the selective pass circuit 312, the multiplexing circuit 314, the bin store circuit 332, and the bin load circuit 334 may be positioned in the GPU mentioned in the embodiment shown in FIG. 1, and the memory buffer 390 may be positioned outside the GPU, where the tile buffer 305 may be selectively implemented within or outside the GPU.

According to this embodiment, the set of shaders {VS0, VS1, VS2, FS, Post} may play a plurality of roles in the graphics processing pipeline, respectively, to complete the rendering result(s) of the rendering operation described in Step 230. For example, the shader VS0 may be arranged for loading some attributes (which can be referred to as the VS0 attributes in this example) of the primitive mentioned in Step 205, and performing position processing to generate positions of the vertices of the primitive. In another example, the shader VS1 may be arranged for loading some attributes (which can be referred to as the VS1 attributes in this example) such as some inputs for the shader VS1, and computing some varyings and outputting these varyings (which can be referred to as the VS1 varyings in this example), where these varyings can be taken as an example of the vertex varyings computed in the binning phase mentioned in Step 220. In another example, the shader VS2 may be arranged for loading some attributes (which can be referred to as the VS2 attributes in this example) such as some inputs for the shader VS2, and computing some varyings and outputting these varyings (which can be referred to as the VS2 varyings in this example), where these varyings can be taken as an example of the vertex varyings computed in the rendering phase mentioned in Step 220. In some examples, the shader FS may be arranged for performing fragment shading according to the inputs thereof (e.g. the varyings received by one of the two input of the multiplexing circuit 314, such as the VS1 varyings or the VS2 varyings) to generate some fragment shading results, and outputting these fragment shading results, and the shader Post may be arranged for performing post processing to complete the rendering result(s) of the rendering operation described in Step 230, where the shader Post may access the tile buffer 305 when needed.

In addition, the checking circuit 310 may control the data flow of the graphics processing pipeline with aid of the selective pass circuit 312, the multiplexing circuit 314, the bin store circuit 332, and the bin load circuit 334, where the selective pass circuit 312 and the multiplexing circuit 314 may operate under control of the checking circuit 310. More particularly, the checking circuit 310 may be arranged for providing the determination result (e.g. the tag information) according to the specific information (e.g. bounding box or other information as mentioned above in describing the determination result), to control the data flow of the graphics processing pipeline by utilizing one of a plurality of configurations of the architecture 300 (more particularly, the plurality of configurations of the graphics processing pipeline). As a result, the checking circuit 310 may check whether it is needed to compute the current vertex (e.g. one of the vertices of the primitive) in a first set of processing stages (e.g. the binning phase), or a second set of processing stages (e.g. the rendering phase), of the graphics processing pipeline. For example, when it is determined that the architecture 300 should compute the current vertex in the first set of processing stages (e.g. the binning phase), the checking circuit 310 may turn on (or enable) the shader VS1 and turn off (or disable) the shader VS2, and may correspondingly enable or disable the associated data paths, respectively. In another example, when it is determined that the architecture 300 should compute the current vertex in the second set of processing stages (e.g. the rendering phase), the checking circuit 310 may turn off (or disable) the shader VS1 and turn on (or enable) the shader VS2, and may correspondingly disable or enable the associated data paths, respectively.

Additionally, the bin store circuit 332 may be arranged for storing bin-table and positions for each vertex of the vertices of the primitive and/or for each primitive of all primitives in the whole frame when needed, and the bin load circuit 334 may be arranged for loading this bin-table and these positions when needed. According to the architecture 300, the apparatus 100 may re-order the VS1 or VS2 varyings after the shader VS2 (e.g. in the last few stages of the graphics processing pipeline, such as one or more of the shaders FS and Post) when needed. Please note that, in a situation where the checking circuit 310 turns on (or enables) the shader VS1, the checking circuit 310 may bypass the positions generated by the shader VS0 (such as the positions labeled "Y" in this example) to the next stage such as the shader VS1, and the shader VS1 may also bypass these positions when needed.

According to some embodiments, in general, any of the shaders VS1 and VS2 can be replaced by an attribute processing circuit. Examples of the function of the attribute processing circuit may include, but not limited to, calculating attributes according to vertices, and processing attributes. For example, the attribute processing circuit can be any fixed function circuit or shader, arranged for processing attributes.

According to some embodiments, the shader Post can be replaced by any of another type of circuits, such as a fixed function circuit.

Figure 4:
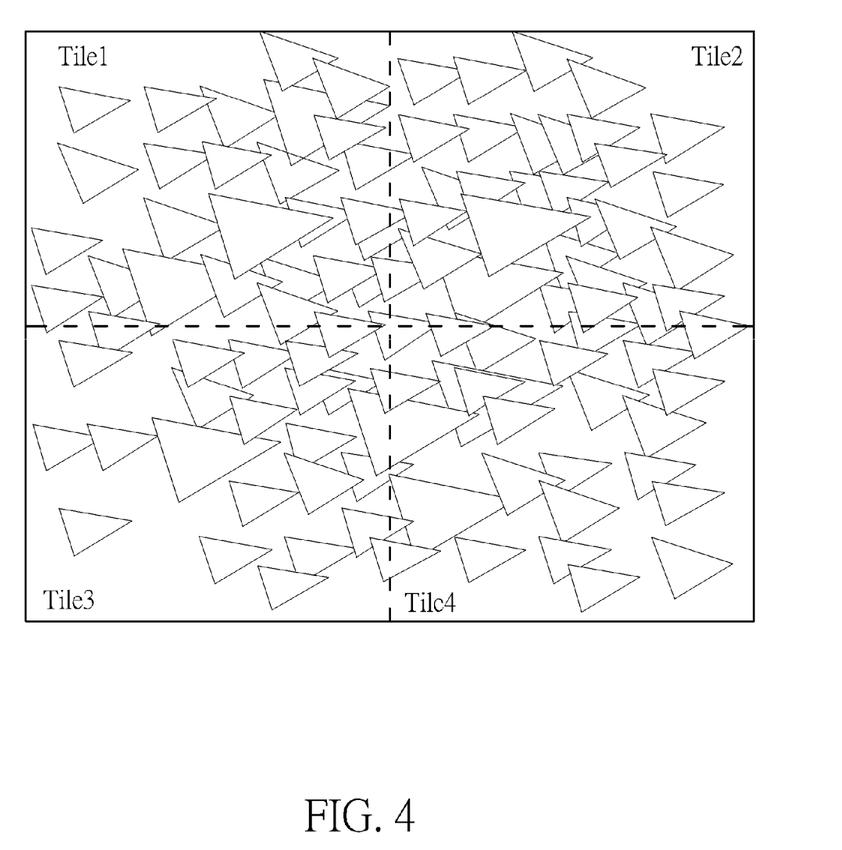
FIG. 4 illustrates at least one portion of a set of primitives to be rendered according to an embodiment of the present invention.

FIG. 4 illustrates at least one portion (e.g. a portion or all) of a set of primitives to be rendered according to an embodiment of the present invention. There may be many primitives within the set of primitives of this embodiment. For example, the number of primitives within this set of primitives may be greater than one hundred. In another example, the number of primitives within this set of primitives may be greater than one thousand. In some examples, the number of primitives within this set of primitives may be greater than ten thousands or more. Please note that the set of primitives of this embodiment may have small sizes, and most of these primitives may touch only one tile of the plurality of tiles Tile1, Tile2, Tile3, and Tile4, respectively.

Figure 5:
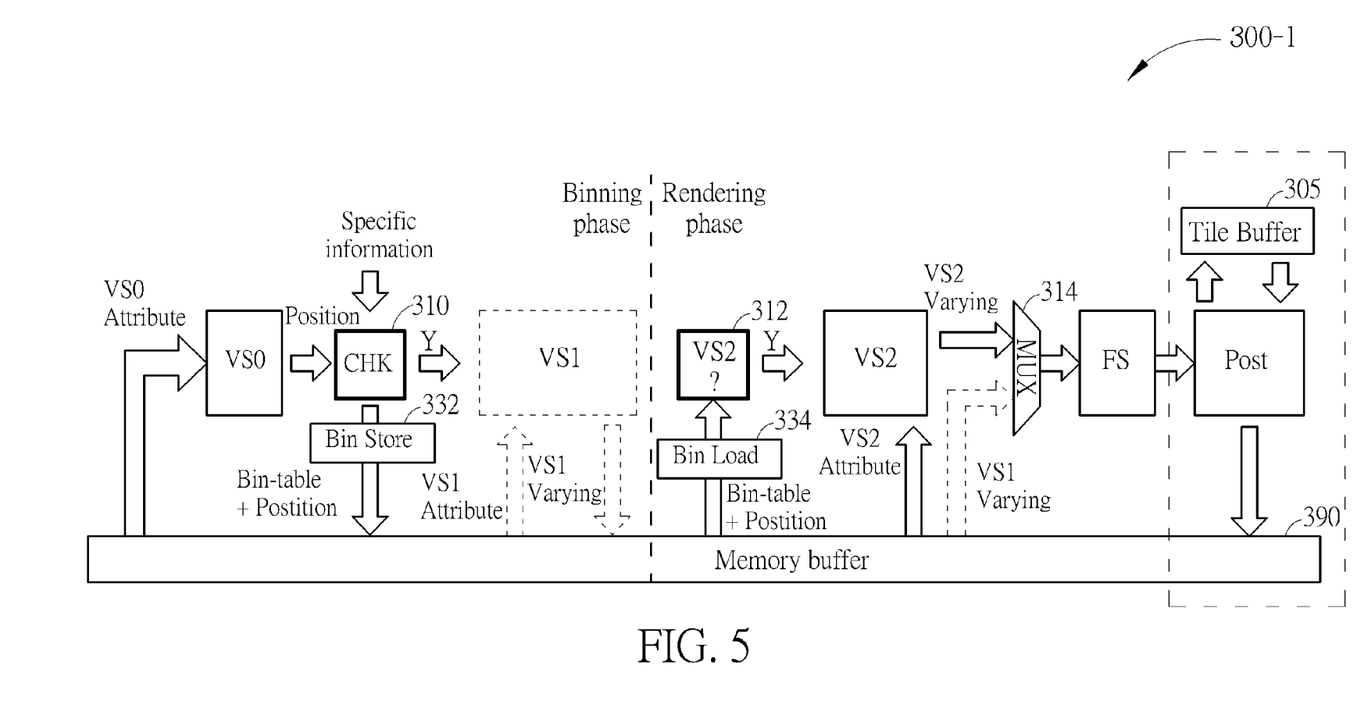
FIG. 5 illustrates a first configuration of a plurality of configurations of the architecture shown in FIG. 3 according to an embodiment of the present invention.

FIG. 5 illustrates a first configuration 300-1 of the plurality of configurations of the architecture 300 shown in FIG. 3 according to an embodiment of the present invention. As shown in FIG. 5, the VS VS1 is turned off and the VS VS2 is turned on, and therefore, the first configuration 300-1 can be referred to as the VS2-on configuration. For example, the first configuration 300-1 can be utilized for rendering the set of primitives of the embodiment shown in FIG. 4.

According to this embodiment, as there is no vertex buffer load/store overhead, the architecture 300 may take the advantage from immediate rendering and, regarding the operations of accessing the memory buffer 390, only accessing the bin-table and the positions mentioned in the embodiment shown in FIG. 3 (e.g. utilizing the bin store circuit 332 to store this bin-table and these positions for each vertex of the vertices, and utilizing the bin load circuit 334 to load this bin-table and these positions) is required, where the data amount of accessing this bin-table and these positions is much less than the data amount of accessing varyings. In addition, as there is no color/depth(Z) access, the architecture 300 may take the advantage from tile-based rendering.

Please note that the first configuration 300-1 is suitable for rendering a lot of small primitives such as the set of primitives of the embodiment shown in FIG. 4, and may achieve the best performance in this situation. Based on the first configuration 300-1 the architecture 300 may render the three-dimensional (3D) scene primitive-by-primitive (i.e. triangle-by-triangle) with less side effects, and therefore may reduce or prevent the related art problem regarding the conventional immediate rendering technologies.

Figure 6:
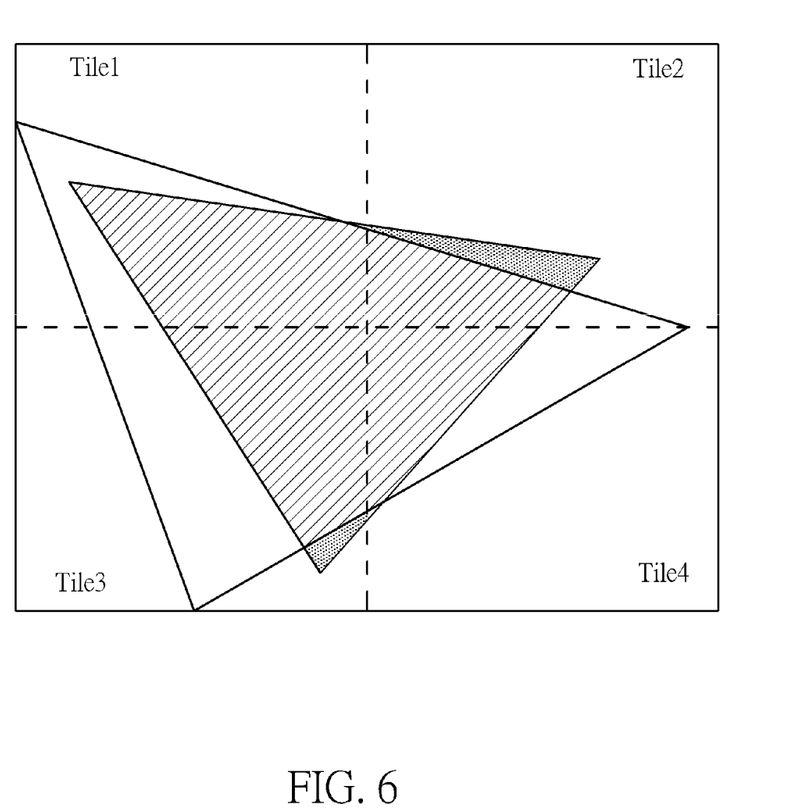
FIG. 6 illustrates at least one portion of another set of primitives to be rendered according to an embodiment of the present invention.

FIG. 6 illustrates at least one portion (e.g. a portion or all) of another set of primitives to be rendered according to an embodiment of the present invention. The number of primitives within the set of primitives of the embodiment shown in FIG. 6 may be much less than the number of primitives within the set of primitives of the embodiment shown in FIG. 4. Please note that one or more primitives within the set of primitives of this embodiment may have large size(s), and may touch most of the plurality of tiles Tile1, Tile2, Tile3, and Tile4, such as all of the plurality of tiles Tile1, Tile2, Tile3, and Tile4.

Figure 7:
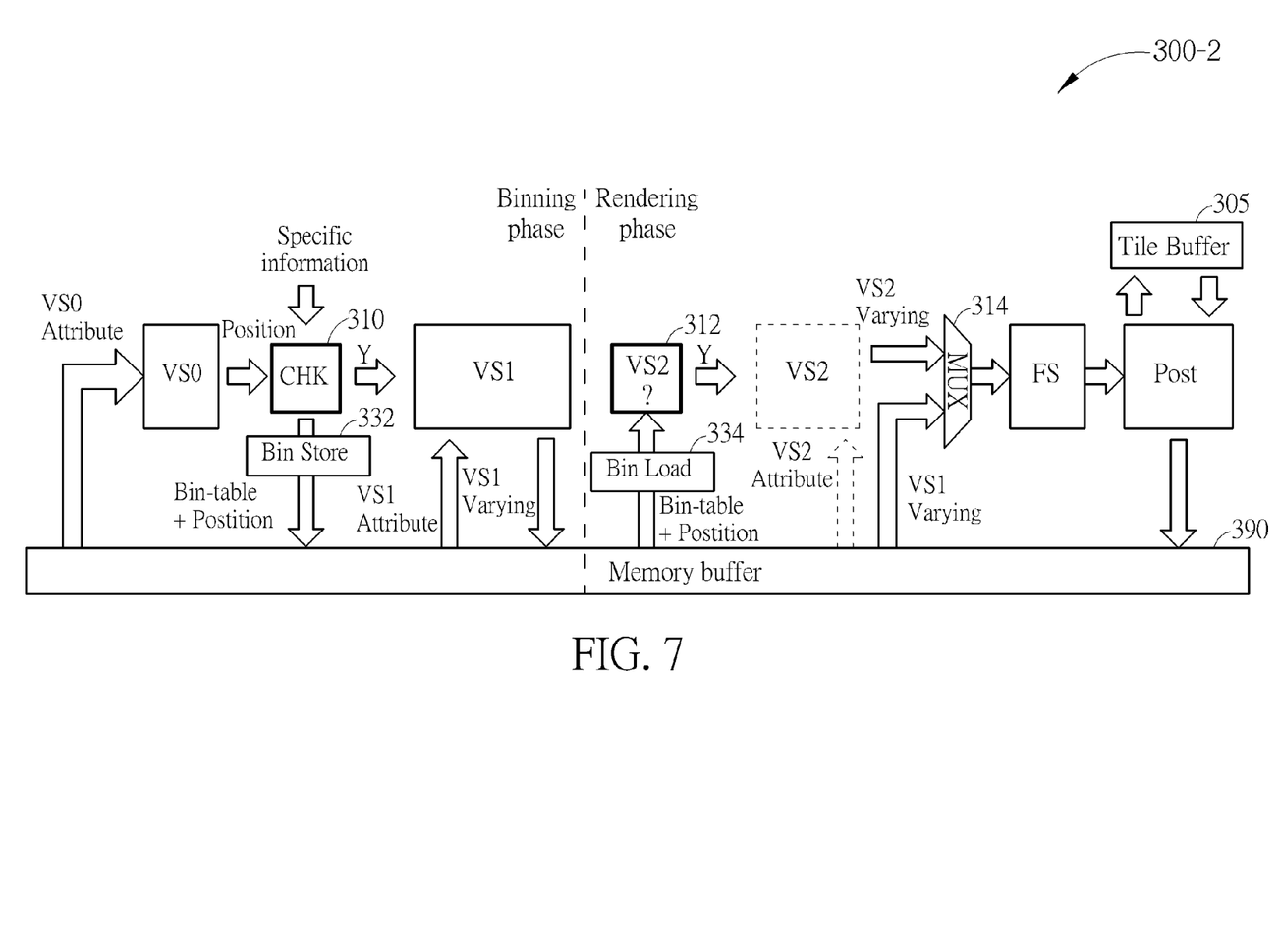
FIG. 7 illustrates a second configuration of the plurality of configurations of the architecture shown in FIG. 3 according to an embodiment of the present invention.

FIG. 7 illustrates a second configuration 300-2 of the plurality of configurations of the architecture 300 shown in FIG. 3 according to an embodiment of the present invention. As shown in FIG. 7, the VS VS2 is turned off and the VS VS1 is turned on, and therefore, the second configuration 300-2 can be referred to as the VS1-on configuration. For example, the second configuration 300-2 can be utilized for rendering the set of primitives of the embodiment shown in FIG. 6.

According to this embodiment, under control of the checking circuit 110, the resultant data flow of the architecture 300 may be similar to that of the conventional TBR technologies, and there is no overhead. Please note that the second configuration 300-2 is suitable for rendering a small group of large primitives such as the set of primitives of the embodiment shown in FIG. 6, and may achieve the best performance in this situation. Based on the second configuration 300-2, the architecture 300 may render the 3D scene bin-by-bin (i.e. tile-by-tile).

According to some embodiments, the checking circuit 110 may check whether the specific information complies with at least one selection criterion of a plurality of selection criteria so as to provide the determination result correspondingly. In the following, a plurality of tables (e.g. Table 1, Table 2, Table 3, and Table 4) are provided, where the criteria of at least one table (e.g. one or more tables) of the plurality of tables can be taken as an example of the plurality of selection criteria. For some details of the criteria of each table of the plurality of tables, please refer to the associated descriptions in the column "Description" of these tables.

TABLE 1

| Criteria | Description |
| --- | --- |
| Input component count | For each shader execution, the input must be read once. |
| Output component count | If memory is output to DRAM, the output will be accessed according to the usage times. |
| Primitive bounding box | Primitive bounding box directs affects the usage times at rendering phase. It may explicitly setting from API/shader program or derived from fixed function pipeline. |
| Primitive type | Different primitive type have specific bounding box range. Some primitive may have extra component. |
| Previous decision result from the same tile and same draw call | With previous decision result, we may calculate the overhead from fragmentation from tiling order. With this information, we may more approach the optimal criteria for the current primitive. |

TABLE 1-continued

| Criteria | Description |
| --- | --- |
| Later shader stage decision result (i.e. VS1/2 selection) | If later shader stage is done at rendering phase, VS0 can combine the later stage to reduce overhead. |
| State counter from non-shader function part in GPU | According to non-shader function pipeline and buffer management (Ex: FIFO/buffer usage, Z test/clipping result and statistics, cache hit rate), we may change the decision to avoid some bottleneck from non-shader functional units. |

TABLE 2

| Criteria | Description |
| --- | --- |
| Memory requirement from compiler | With more memory requirement, the latency will be higher due to limited memory bandwidth. |
| Bandwidth profiling and usage information | If GPU memory bandwidth usage is low, we may favor computation more. |
| System-level status and requirement | If system memory interface is busy, we may prefer the configuration with less bandwidth even with much higher loading in execution unit. Also, GPU may adjust its preference on bandwidth or power according to system requirement. |
| Utilization profiling information from execution unit | If execution unit is mostly idle, more computation will not cause impact on performance. We may check if the computation overhead raise over the idle time; if not, we may just ignore the computation overhead impact. |
| Power/heat index from power estimator | If power or heat raises over some threshold, it may hurt battery or hurt system performance. On-chip computation and off-chip bandwidth contribute to power in some proportion and need to be optimized at whole chip level. |
| Stored profiling data for the same program | The optimal criteria may differ from application to application due to method of usage. Since driver may know current application, we may store a per-application profiling data and use the data to apply "Profile Guided Optimization." |
| Hint sent from CPU | GPU may provide a method/API for driver or application to give GPU a hint according to requirement. |

TABLE 3

| Criteria | Description |
| --- | --- |
| Instancing setting | If instancing is on, more information is required to stored to external buffer, and complex divisor function management is required. The overhead should also be considered. |
| Tessellation setting and parameters. | If tessellation is on, it is expected that much more primitives is generated and may highly affects bandwidth and computation. The tessellation results should be considered. |
| Geometry shader information | Since number of primitive emitted by geometry shader is decided at run-time, we may not know how many primitives is to be emitted. If geometry shader emits many primitives, it may impact the bandwidth and need to taken care. We may done this by enabling of geometry shader, compiler information or profiling. |
| Draw call vertex number | If a draw call has many vertices, it is likely the fragmentation of redo VS0 at |

TABLE 3-continued

| Criteria | Description |
|---|---|
| | rendering phase is lower. |
| Draw call bounding box | If a draw call has large bounding box, it is likely the vertices are sparse and has higher performance impact on redo VS0. |

TABLE 4

| Criteria | Description |
|---|---|
| On-chip buffer size | If some on-chip buffer size alters, data spilling may occur and buffer utilization should be constrained. Also, bandwidth should also more constrained in this case. |
| Input data correlation between shader stages | If input data between shader stages has higher correlation in its address, the bandwidth and latency could be reduced due to data locality and may be covered by fewer large memory access bursts. As a result, it more favorable to do together. |
| External buffer usage | If the external buffer is nearly full at binning phase, it is unfavorable to store more data into it. In this case, we should make storing to it with higher costs. If the buffer is full, we should stop storing any output and redo VS0 at rendering phase. |

According to some embodiments, the spirit of the present invention can be extended to tessellation. The tessellation process is divided into three stages which form an optional part of Vertex Processing in the rendering pipeline. Two of the stages are programmable; between them may be a fixed function stage.

For example, the three stages may comprise the stages of TCS, PG, and TES, in their processing order. According to a functional viewpoint of the present invention, the tessellation process can be performed after the processing of the shaders VS0, VS1, and VS2 and performed before the processing of the shader FS. More particularly, a prototype of the processing order "VS0→CHK→VS1/VS2→FS" (which means this processing order starts from the processing of the shader VS0, and then goes through the operation of the checking circuit 310, and the processing of the shaders VS1 and/or VS2, and afterward the processing of the shader FS) may be obtained from the embodiment shown in FIG. 7, and this prototype may be modified for the tessellation process into a first tessellation architecture, a second tessellation architecture, and a third tessellation architecture, respectively.

Regarding implementation of the first tessellation architecture, the shader VS0 shown in FIG. 7 may be replaced by a stage $VS_{VS0, VS1, VS2}$ arranged for performing all calculations of vertex shading, such as all calculations of the shaders VS0, VS1, and VS2. In addition, each of the shaders VS1 and VS2 shown in FIG. 7 may be replaced by a copy of the stages TCS, PG, and TES. For example, the shader VS1 shown in FIG. 7 may be replaced by the stages {TCS1, PG1, TES1} (e.g. one copy of the stages {TCS, PG, TES}), and the shader VS2 shown in FIG. 7 may be replaced by the stages {TCS2, PG2, TES2} (e.g. another copy of the stages {TCS, PG, TES}). As a result, the tessellation calculations may be performed in the binning phase or the rendering phase, while the vertex shading may be performed in the binning phase. For brevity, similar descriptions for the first tessellation architecture are not repeated in detail here.

Regarding implementation of the second tessellation architecture, the shader VS0 shown in FIG. 7 may be replaced by a stage $VS_{VS0, VS1, VS2, TCS}$ arranged for performing all calculations of vertex shading, such as all calculations of the shaders VS0, VS1, and VS2, and further performing the processing of the stage TCS. In addition, each of the shaders VS1 and VS2 shown in FIG. 7 may be replaced by a copy of the stages PG and TES. For example, the shader VS1 shown in FIG. 7 may be replaced by the stages {PG1, TES1} (e.g. one copy of the stages {PG, TES}), and the shader VS2 shown in FIG. 7 may be replaced by the stages {PG2, TES2} (e.g. another copy of the stages {PG, TES}). For brevity, similar descriptions for the second tessellation architecture are not repeated in detail here.

Regarding implementation of the third tessellation architecture, the shader VS0 shown in FIG. 7 may be replaced by a stage $VS_{VS0, VS1, VS2, TCS, PG}$ arranged for performing all calculations of vertex shading, such as all calculations of the shaders VS0, VS1, and VS2, and further performing the processing of the stages TCS and PG. In addition, each of the shaders VS1 and VS2 shown in FIG. 7 may be replaced by a copy of the stage TES. For example, the shader VS1 shown in FIG. 7 may be replaced by the stage TES1 (e.g. one copy of the stage TES), and the shader VS2 shown in FIG. 7 may be replaced by the stage TES2 (e.g. another copy of the stage TES). For brevity, similar descriptions for the third tessellation architecture are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A graphics processing method, the graphics processing method being applied to a graphics processing apparatus within an electronic device, the graphics processing method comprising:
   calculating, via the graphics processing apparatus, vertex positions of a primitive in a binning phase;
   determining, via the graphics processing apparatus, according to specific information, whether to compute vertex varyings of the primitive in the binning phase or in a rendering phase so as to provide a determination result;
   computing, via the graphics processing apparatus, the vertex varyings in the binning phase or in the rendering phase according to the determination result; and
   rendering, via the graphics processing apparatus, the primitive according to the vertex positions and the vertex varyings in the rendering phase.

2. The graphics processing method of claim 1, wherein the determination result is one of the following:
   tag information, wherein the tag information is accessible by a pointer associated with the primitive; and
   a control signal, wherein the control signal is applied to a circuitry of the graphics processing apparatus.

3. The graphics processing method of claim 1, wherein the step of determining whether to compute the vertex varyings of the primitive in the binning phase or in the rendering phase comprises:
   checking whether the specific information complies with a selection criterion so as to provide the determination result correspondingly.

4. The graphics processing method of claim 3, wherein the specific information is information of a primitive size of the primitive, and the selection criterion corresponds to a primitive size threshold; and the step of determining whether to compute the vertex varyings of the primitive in the binning phase or in the rendering phase comprises:

checking whether the primitive size reaches the primitive size threshold so as to provide the determination result correspondingly.

5. The graphics processing method of claim 3, wherein the specific information is information of a bin count of a plurality of bins touched by the primitive, and the selection criterion corresponds to a bin count threshold; and the step of determining whether to compute the vertex varyings of the primitive in the binning phase or in the rendering phase comprises:

checking whether the bin count reaches the bin count threshold so as to provide the determination result correspondingly.

6. The graphics processing method of claim 3, wherein the specific information is information of a shader code architecture, and the selection criterion corresponds to classification information for classifying the shader code architecture; and the step of determining whether to compute the vertex varyings of the primitive in the binning phase or in the rendering phase comprises:

classifying the shader code architecture according to the information of the shader code architecture and according to the classification information so as to provide the determination result correspondingly.

7. The graphics processing method of claim 1, wherein the specific information is complier information.

8. The graphics processing method of claim 1, wherein the specific information is updated frame by frame; and the method further comprises:

analyzing a specific frame to update the specific information for the specific frame, wherein the specific frame comprises the primitive.

9. The graphics processing method of claim 1, wherein the step of calculating vertex positions of the primitive in the binning phase is according to a set of attributes associated with the primitive.

10. The graphics processing method of claim 1, wherein at least one varying of the vertex varyings is a varying of a vertex of the primitive, or a varying of a point within the primitive.

11. A graphics processing apparatus, the graphics processing apparatus being positioned within an electronic device, the graphics processing apparatus comprising at least one portion of the electronic device, the apparatus comprising:

a checking circuit, arranged for determining, according to specific information, whether to compute vertex varyings of a primitive in a binning phase or in a rendering phase so as to provide a determination result; and at least one shader, coupled to the checking circuit, arranged for calculating vertex positions of the primitive in the binning phase, computing the vertex varyings in the binning phase or in the rendering phase according to the determination result, and rendering the primitive according to the vertex positions and the vertex varyings in the rendering phase.

12. The graphics processing apparatus of claim 11, wherein the determination result is one of the following:

tag information, wherein the tag information is accessible by a pointer associated with the primitive; and a control signal, wherein the control signal is applied to a circuitry of the graphics processing apparatus.

13. The graphics processing apparatus of claim 11, wherein the checking circuit checks whether the specific information complies with a selection criterion so as to provide the determination result correspondingly.

14. The graphics processing apparatus of claim 13, wherein the specific information is information of a primitive size of the primitive, and the selection criterion corresponds to a primitive size threshold; and the checking circuit checks whether the primitive size reaches the primitive size threshold so as to provide the determination result correspondingly.

15. The graphics processing apparatus of claim 13, wherein the specific information is information of a bin count of a plurality of bins touched by the primitive, and the selection criterion corresponds to a bin count threshold; and the checking circuit checks whether the bin count reaches the bin count threshold so as to provide the determination result correspondingly.

16. The graphics processing apparatus of claim 13, wherein the specific information is information of a shader code architecture, and the selection criterion corresponds to classification information for classifying the shader code architecture; and the checking circuit classifies the shader code architecture according to the information of the shader code architecture and according to the classification information so as to provide the determination result correspondingly.

17. The graphics processing apparatus of claim 11, wherein the specific information is complier information.

18. The graphics processing apparatus of claim 11, wherein the specific information is updated frame by frame; and the apparatus analyzes a specific frame to update the specific information for the specific frame, wherein the specific frame comprises the primitive.

19. The graphics processing apparatus of claim 11, wherein the at least one shader is a unified shader.

20. The graphics processing apparatus of claim 11, wherein at least one varying of the vertex varyings is a varying of a vertex of the primitive, or a varying of a point within the primitive.

* * * * *